(12) United States Patent
Subramanian et al.

(10) Patent No.: US 12,715,399 B2
(45) Date of Patent: Aug. 25, 2026

(54) SYSTEM AND METHOD FOR HANDLING COMBINATION VEHICLE BRAKE TORQUE FACTOR USING TRAILER WHEEL END AIR VOLUME

(71) Applicant: Volvo Truck Corporation, Gothenburg (SE)

(72) Inventors: Chidambaram Subramanian, Jamestown, NC (US); Robert Newton, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 48 days.

(21) Appl. No.: 18/897,191

(22) Filed: Sep. 26, 2024

(65) Prior Publication Data

US 2026/0084667 A1 Mar. 26, 2026

(51) Int. Cl.
*B60T 8/17* (2006.01)
*B60T 8/171* (2006.01)
(Continued)

(52) U.S. Cl.
CPC ............ *B60T 8/1708* (2013.01); *B60T 8/171* (2013.01); *B60T 8/172* (2013.01); *B60T 8/174* (2013.01);
(Continued)

(58) Field of Classification Search
CPC ........ B60T 8/1708; B60T 8/171; B60T 8/172; B60T 8/174; B60T 13/26–45; B60T 2220/04; B60T 2250/00
See application file for complete search history.

(56) References Cited

U.S. PATENT DOCUMENTS 5,080,445 A 1/1992 Brearley et al.
5,415,466 A * 5/1995 Breen .................... B60T 13/66 303/9.62
(Continued)

FOREIGN PATENT DOCUMENTS

DE 102011017018 B3 7/2012
EP 0697314 A2 2/1996
(Continued)

OTHER PUBLICATIONS

Arcoore Truck Parts, “EBS system—what is it and how does it work?” retrieved Aug. 28, 2024 from the Internet: [URL: https://arcoore.co.uk/what-is-the-ebs-system/], 8 pages.
(Continued)

*Primary Examiner* — Mark L. Greene
(74) *Attorney, Agent, or Firm* — Withrow & Terranova, PLLC

(57) ABSTRACT

A method for handling brake factor of a combination vehicle (i.e., a towing vehicle and at least one trailer) includes sensing a condition indicative of air volume at trailer wheel ends, estimating an air volume for the trailer wheel ends, generating a predicted brake torque factor for the trailer(s) with a trained machine learning model utilizing the estimated air volume, and reconfiguring an electronic control unit of the combination vehicle with the predicted brake torque factor. A corresponding system for handling brake factor of a combination vehicle includes one or more sensors, a processing module, and a control module. The processing module estimates an air volume for trailer wheel ends, and generates a predicted brake torque factor for the trailer(s) with a trained machine learning model. The control module is arranged to reconfigure an ECU of the combination vehicle with the predicted brake torque factor.

18 Claims, 5 Drawing Sheets

(51) Int. Cl.
*B60T 8/172* (2006.01)
*B60T 8/174* (2006.01)

(52) U.S. Cl.
CPC ....... *B60T 2220/04* (2013.01); *B60T 2250/00* (2013.01)

(56) References Cited

U.S. PATENT DOCUMENTS

| | | | |
|---|---|---|---|
| 11,180,127 | B2 | 11/2021 | Farres et al. |
| 11,691,609 | B2 | 7/2023 | Laine et al. |
| 11,702,054 | B2 | 7/2023 | Henderson et al. |
| 11,772,624 | B2 | 10/2023 | Subramanian et al. |
| 12,151,662 | B2 | 11/2024 | Brütt et al. |
| 2010/0211279 | A1 | 8/2010 | Lingman et al. |
| 2012/0109465 | A1 | 5/2012 | Svensson et al. |
| 2018/0306665 | A1 | 10/2018 | Doray et al. |
| 2018/0319380 | A1 | 11/2018 | Laine et al. |
| 2018/0319382 | A1 | 11/2018 | Laine et al. |
| 2023/0042019 | A1 | 2/2023 | Tione et al. |
| 2023/0282113 | A1 | 9/2023 | Sharma |
| 2023/0322223 | A1 | 10/2023 | Sawodny et al. |
| 2023/0334435 | A1 | 10/2023 | Subramanian |

FOREIGN PATENT DOCUMENTS

| | | | |
|---|---|---|---|
| EP | 2448795 | A1 | 5/2012 |
| EP | 2570312 | A1 | 3/2013 |
| EP | 2570314 | A1 | 3/2013 |
| EP | 3888982 | A2 | 10/2021 |
| EP | 4190598 | A1 | 6/2023 |
| EP | 4190636 | A1 | 6/2023 |
| EP | 4001031 | B1 | 1/2024 |
| JP | 2014118065 | A | 6/2014 |
| WO | 2019210960 | A1 | 11/2019 |
| WO | 2020192878 | A1 | 10/2020 |

OTHER PUBLICATIONS

Knorr-Bremse, "EBS 7—Electronic Braking System for Trucks," Y434004-EN-001, Dec. 2022, 1 page.

Knorr-Bremse, "Electronic braking control—Control via driving dynamics," Retrieved Aug. 28, 2024 from the Internet: [URL: https://truck.knorr-bremse.com/en/us/products/brake-control/electronic-braking-control/], 19 pages.

SGI, "Simple tractor-trailer system," Air Break Manual, Jun. 2024, available online: [URL: https://sgi.sk.ca/air-brake/-/knowledge_base/air-brake/simple-tractor-trailer-system], 2 pages.

Extended European Search Report for European Patent Application No. 25197880.5, mailed Feb. 6, 2026, 9 pages.

* cited by examiner

FW-L
WSSa
WSSb
PBR2
BC
WBCU
ES1
ES2
29
braking actuation
FW-R
AC2
16
18
Park
19
MCPV
6
61
9
Trailer Relay valve
PBR3
Autonomous Drive ECU1
71
Autonomous Drive ECU2
72
75
AC4
Truck PBR relay Valve
8
PBR1 & PBR2
R2
R1
AC1
AC0
60
62
11
Wheel speed sensors
RW-L
PBR1
30a
RW-R
Further Rear Axles

SYSTEM AND METHOD FOR HANDLING COMBINATION VEHICLE BRAKE TORQUE FACTOR USING TRAILER WHEEL END AIR VOLUME

TECHNICAL FIELD

The disclosure relates to electro-pneumatic braking of an automotive vehicle. In particular aspects, the disclosure relates to handling brake torque factor of a combination vehicle including at least one trailer. The disclosure can be applied to heavy-duty combination vehicles, such as trucks and construction equipment, among other vehicle types. Although the disclosure may be described with respect to a particular vehicle, the disclosure is not restricted to any particular vehicle.

BACKGROUND

Heavy duty vehicles including trucks frequently utilize electro-pneumatic braking systems that use pressurized air as a working fluid. Electronic controls on top of baseline pneumatic systems have been developed to provide advanced capabilities and improved response at wheel axles. In the context of combination vehicles (e.g., trucks) that include a towing vehicle and at least one trailer, electronic braking controls may be associated with a towing vehicle, but there may be limited electronic braking communication between a towing vehicle and the at least one trailer. Compressed air may be supplied by a towing vehicle to one or more trailers (e.g., including a supply connection and a service (signal) connection), whereby a braking command issued by the towing vehicle may take the form of a pneumatic signal sent to the trailer(s).

Braking efficiency of combination vehicles can be improved by appropriate distribution of braking effort among the various axles of the combination vehicle. A towing vehicle that may perform well with one trailer may perform poorly with another trailer, due to variation in brake type (e.g., drum versus disc), brake wear, trailer loading, number of towed axles, and so on, among different trailers. An electronic control unit (ECU) for a braking control system of a towing vehicle may include a parameter for brake torque factor (i.e., braking torque per unit pressure for a pneumatically operated braking system), which may be useful for many braking functions. However, it may be difficult to easily determine a suitable brake torque factor for particular trailer(s) and trailer load(s), with the situation being complicated by the fact that towing vehicles may be utilized with constantly changing trailers and/or trailer loads, especially in a commercial context.

A closed loop control system may estimate forces from sensed longitudinal deceleration. A target deceleration may be used to determine force (and torque) on a tire, and further determine the necessary braking pressure (e.g., bar) between axles in towing vehicles and pressure to the trailers to achieve the necessary braking torque. A constant trailer brake torque factor is typically used. However, brake torque requirements are subject to variation due to numerous factors, including temperature of brake components (e.g., pads, rotors, drums, shoes, etc.), relative speed, pressure, brake/tire wear, tire dynamic rolling radius (varying with tire pressure, speed, and load). Thus, use of a constant brake torque factor not tailored to specific trailers and conditions is not ideal to provide suitable braking performance over all driving conditions.

SUMMARY

According to a first aspect of the disclosure, a method for handling a brake torque factor of a combination vehicle including a towing vehicle and at least one trailer is provided, the method comprising: sensing at least one condition indicative of air volume of trailer wheel ends of the at least one trailer and producing at least one sensor output; estimating an air volume for the trailer wheel ends of the at least one trailer, utilizing at least one sensor output obtained from one or more sensors configured to sense at least one condition indicative of air volume of trailer wheel ends of the at least one trailer; generating, by a trained machine learning model, a predicted brake torque factor for the at least one trailer utilizing at least one input, wherein the at least one input comprises the estimated air volume; and reconfiguring an electronic control unit of the combination vehicle with the predicted brake torque factor to permit the electronic control unit to utilize the predicted brake torque factor in adjusting a brake pressure request sent to the at least one trailer to achieve a desired brake torque at the at least one trailer and attain a targeted deceleration of the combination vehicle. The first aspect of the disclosure may seek to address challenges with estimating brake torque factors and employing changing brake torque factors for specific combination vehicles, noting that trailers and trailer loads for use with a combination vehicle may frequently change. A technical benefit may include improved braking performance, improved safety, and enhanced driver confidence for combination vehicles.

Optionally in some examples, including in at least one preferred example, the at least one input further comprises one or more of: a gross weight of the combination vehicle, and individual drive axle load information for the towing vehicle.

Optionally in some examples, including in at least one preferred example, the at least one input further comprises signals indicative of one or more of: motion of the combination vehicle; temperature of an environment in which the combination vehicle is located; brake component temperature; and driver control inputs produced by of a driver of the towing vehicle.

Optionally in some examples, including in at least one preferred example, the method further comprises issuing a brake request to the at least one trailer, wherein the sensing of the at least one condition is performed responsive to issuance of the brake request.

Optionally in some examples, including in at least one preferred example, the brake request is configured to apply a parking brake of the at least one trailer.

Optionally in some examples, including in at least one preferred example, the sensing of the at least one condition indicative of air volume of the trailer wheel ends of the at least one trailer comprises at least one of: detecting a time required to fill the trailer wheel ends of the at least one trailer with air; detecting a volumetric and/or air mass flow rate while filling the trailer wheel ends of the at least one trailer with air; and detecting a pressure differential between a pressurized air source and the trailer wheel ends of the at least trailer while filling the trailer wheel ends with air.

Optionally in some examples, including in at least one preferred example, the trained machine learning model is trained based on a plurality of training combination vehicles having differing numbers of trailers and differing associated brake torque factors.

Optionally, in some examples, the trained machine learning model is trained with a recurrent neural network.

According to a second aspect of the disclosure, a system for handling a brake torque factor of a combination vehicle including a towing vehicle and at least one trailer is provided, wherein the system comprises: one or more sensors configured to sense at least one condition indicative of air volume of trailer wheel ends of the at least one trailer and produce a corresponding at least one sensor output; a processing module configured to: (i) estimate an air volume for the trailer wheel ends of the at least one trailer utilizing at least one sensor output, and (ii) generate, by a trained machine learning model, a predicted brake torque factor for the at least one trailer utilizing at least one input, wherein the at least one input comprises the estimated air volume; and a control module arranged to reconfigure an electronic control unit of the combination vehicle with the predicted brake torque factor to permit the electronic control unit to utilize the predicted brake torque factor in adjusting a brake pressure request sent to the at least one trailer to achieve a desired brake torque at the at least one trailer and attain a targeted deceleration of the combination vehicle. The second aspect of the disclosure may seek to address challenges with estimating brake torque factors and employing changing brake torque factors for specific combination vehicles, noting that trailers and trailer loads for use with a combination vehicle may frequently change. A technical benefit may include improved braking performance, improved safety, and enhanced driver confidence for combination vehicles.

Optionally in some examples, including in at least one preferred example, the processing module comprises a processor and a non-transitory computer-readable memory device having stored therein an artificial neutral network and instructions which, when executed by the processor, cause the processor the generate the predicted brake torque factor for the at least one trailer utilizing at least one input.

Optionally in some examples, including in at least one preferred example, the at least one input further comprises one or more of: a gross weight of the combination vehicle, and individual drive axle load information for the towing vehicle.

Optionally in some examples, including in at least one preferred example, the at least one input further comprises signals indicative of one or more of: motion of the combination vehicle; temperature of an environment in which the combination vehicle is located; and driver control inputs produced by of a driver of the towing vehicle.

Optionally in some examples, including in at least one preferred example, the processing module is configured to generate the predicted brake torque factor responsive to issuance of a brake request to the at least one trailer following a filling of the trailer wheel ends of the at least one trailer with air.

Optionally in some examples, including in at least one preferred example, the brake request is configured to apply a parking brake of the at least one trailer.

Optionally in some examples, including in at least one preferred example, the at least one condition indicative of air volume of the trailer wheel ends of the at least one trailer comprises at least one (or two, or all three) of: a time required to fill the trailer wheel ends of the at least one trailer with air; a volumetric or mass flow rate for filling the trailer wheel ends of the at least one trailer with air; and a pressure differential between a pressurized air source and the trailer wheel ends of the at least trailer while filling the trailer wheel ends with air.

Optionally in some examples, including in at least one preferred example, the trained machine learning model is trained based on a plurality of training combination vehicles having differing numbers of trailers and differing associated brake torque factors.

Optionally in some examples, including in at least one preferred example, the trained machine learning model is trained with a recurrent neural network.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

Examples are described in more detail below with reference to the appended drawings.

Aspects of the disclosure relate to a method and a system for handling a brake factor (i.e., brake torque factor) of a combination vehicle including a towing vehicle and at least one trailer. Normally, drum brakes have a higher brake torque factor than disc brakes, and trailers may be provided with brakes of either type. Additionally, drum brakes usually have higher chamber volume (service and parking) than disc brakes. Aspects herein employ detection or estimation of trailer wheel end air volume and utilize a trained machine learning model incorporating the estimated air volume as a basis for generating a predicted brake torque factor for one or more trailers, whereby an electronic control unit of the combination vehicle may be reconfigured with the predicted brake torque factor.

To provide context, a combination vehicle and an electro-pneumatic braking system for such a vehicle will be introduced, and followed by details of the disclosed aspects.

Figure 1:
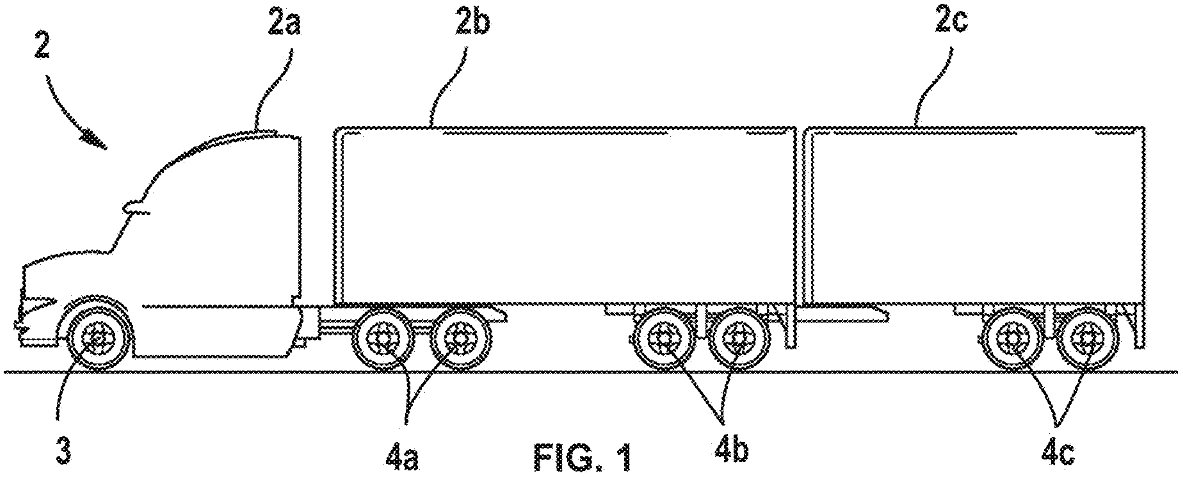
FIG. 1 is an exemplary side elevational view of a combination vehicle including a towing vehicle arranged to two first and second trailers.

FIG. 1 is an exemplary side elevational view of a combination vehicle 2 including a towing vehicle (e.g., a tractor unit, also known as a truck unit or prime mover) 2*a* arranged to tow a first trailer 2*b* and a second trailer 2*c*, wherein each of the first and second trailers 2*b*, 2*c* may embody a semi-trailer lacking a front axle. As shown, the towing vehicle includes a steerable front axle 3 and two rear axles 4*a*, while the first trailer 2*b* includes two rear trailer axles 4*b*, and the second trailer 2*c* includes two rear trailer axles 4*c*. Each axle 3, 4*a*-4*c* of the combination vehicle 2 is equipped with a brake.

Figure 2:
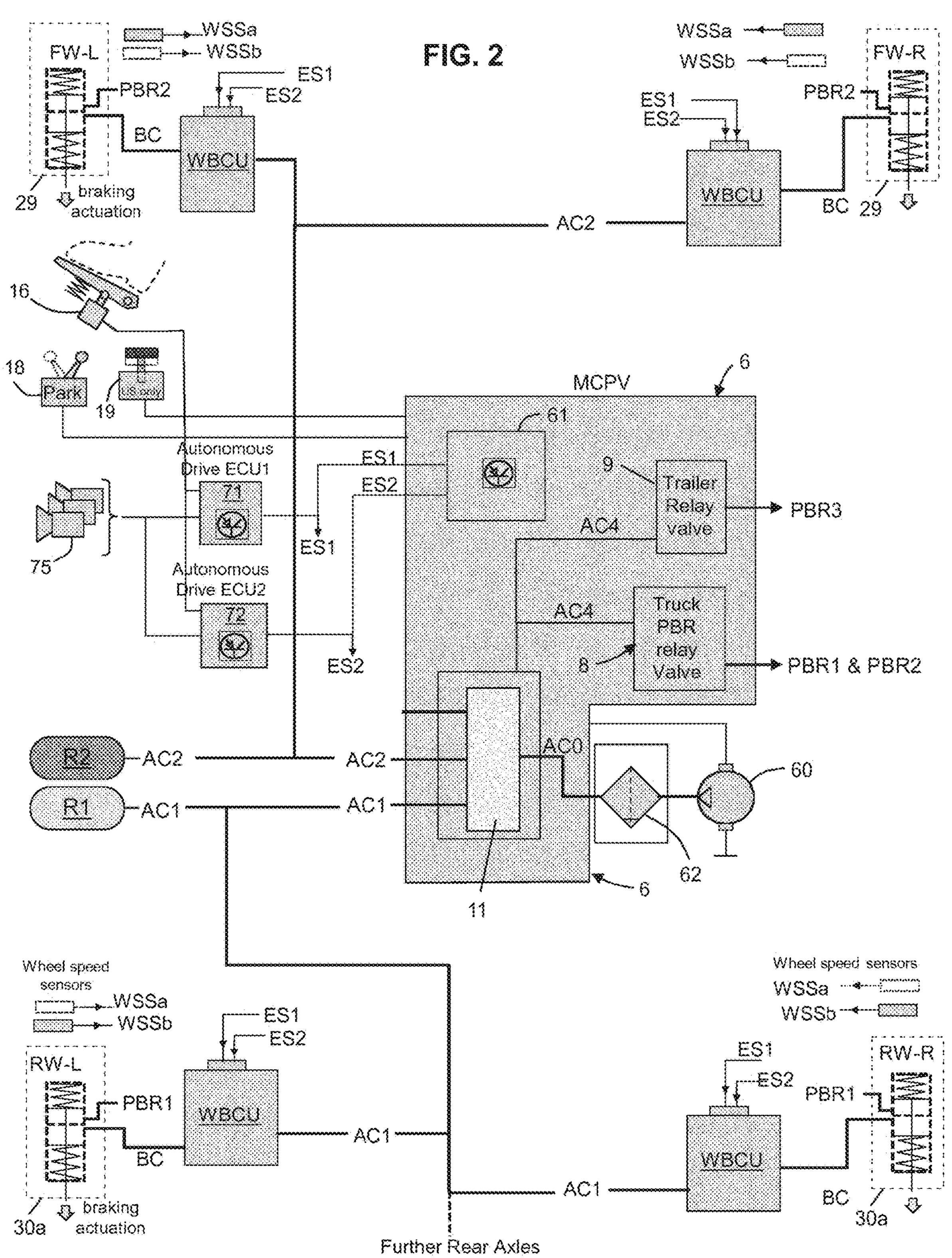
FIG. 2 shows a diagrammatical circuit layout of an electro-pneumatic braking system for a combination vehicle such as a truck.

FIG. 2 shows a diagrammatical circuit layout of an electro-pneumatic braking system for a combination vehicle such as a truck. For the sake of clarity, the same brake actuator (labeled as RW-L, RW-R, FW-L, FW-R, with RW signifying 'rear wheel," FW signifying 'front wheel,' L signifying 'left,' and R signifying 'right') is represented for four wheels of combination vehicle in FIG. 2, but there may be variations and differences according to the location of the wheel (front, rear, trailer, etc.). Each front brake actuator FW-L, FW-R may be associated with a corresponding front wheel end 29*a* as part of a front axle assembly, and each rear brake actuator RW-L, RW-R may be associated with a corresponding rear wheel end 30*a* as part of a rear axle assembly (or a trailer axle assembly as appropriate). As is known, the brake actuators RW-L, RW-R, FW-L, FW-R can embody service brake actuators and parking brake actuators. A generic brake actuator BA of such type is shown in more detail in FIG. 3.

Figure 3:
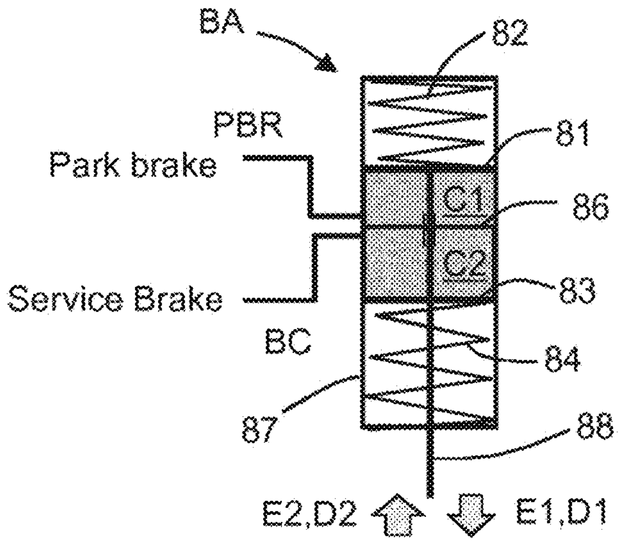
FIG. 3 illustrates a brake pneumatic actuator, which may be included as part of a wheel end of a trailer of a combination vehicle.

As shown in FIG. 3, a brake actuator BA includes a first piston 81 loaded by a first spring 82 which exerts a first effort E1 in a first direction D1. The brake actuator BA also includes a second piston 83 loaded by a second spring 84 which exerts a second effort E2 in a direction D2 opposite to direction D1. Piston 83 is rigid with an output rod 88 of brake actuator which drives an associated brake mechanism (brake pads, disc, etc. not shown). A fixed wall 86 is mounted within a housing 87 of the brake actuator BA. Wall 86 defines, respectively with pistons 81 and 83, two chambers C1, C2 of a variable volume. The rod 88 is coupled to the piston 83, crosses the wall 86 in an airtight manner and is coupled to the piston 81. Springs 82 and 84 are chosen so that effort E1 is larger than effort E2. Thus, in absence of air pressure within chambers C1 and C2, effort E1 pushes piston 81 in direction D1. This effort is transmitted by piston 83 to rod 88 to actuate the associated brake mechanism in a first direction. Under such circumstances, a brake mechanism engages the brake disc(s) or drum(s) of the associated wheel or wheels, corresponding to a park brake actuation for a truck. In other words, when no air under pressure is provided to the brake actuator BA, the parking brake of the truck is actuated. Instead of the pistons 81, 83, flexible membranes or diaphragms can be used.

With continued reference to FIG. 3, when air under pressure is provided to chamber C1 supplied by parking brake release (PBR) air circuit (correspondingly labeled in FIG. 2 as PBR2 for front, PBR1 for rear, and PBR3 for trailer), the air pressure within the chamber C1 pushes piston 81 against the action of spring 82, and spring 84 pushes piston 83 in direction D2. This corresponds to the release of the parking brake of the truck by releasing the air pressure. When the parking brake has been released and if air under pressure is provided to chamber C2 (as supplied by input BC (signifying Brake Control)), the air pressure within chamber C2 pushes piston 83 in direction D1 which progressively actuates a brake mechanism in order to brake the corresponding wheel or wheels. The mechanical effort delivered by the brake actuator BA to the corresponding brake mechanism increases with the air pressure delivered to chamber C2. This corresponds to the actuation of the service brake of the truck, wherein the service brake actuator including chamber C2 is the device that transforms air pressure into a mechanical force for brake actuation.

A combination vehicle may include more than four brake actuators, but in the case of FIG. 2, two front axles, and/or two or more rear axles are provided. Any suitable number of brake actuators can be provided (e.g., two, four, six, eight, etc.), wherein it is noted that in some examples, the number of brake actuators can be twice the number of axles. In one example, the parking brake function can be omitted from some brake actuators. In the illustrated example of FIG. 2, each brake actuator is associated with a brake control module, referred to as a wheel brake control unit WBCU, which may also be called a wheel brake control device.

Although the example of FIG. 2 shows only four wheel brake control units (e.g., two WBCUs associated with a front axle and two WBCUs associated with a rear axle of a towing vehicle), it is to be appreciated that additional wheel brake control units may be provided for one or more trailers coupled to a towing vehicle.

As shown in FIG. 2, a first air reservoir R1 is coupled to a first air supply circuit AC1, and a second air reservoir R2 is coupled to a second air supply circuit AC2. Each air reservoir R1, R2 may also be termed a vessel. The first and second air supply circuits AC1, AC2, may have a service pressure preferably in a range of 5 bars-15 bars, or more preferably in a range of 7 bars-12 bars. As shown, the first air supply circuit AC1 provides pressurized air to each wheel brake control unit WBCU of the rear axle (and further rear axles of one or more trailer), and the second air supply circuit AC2 provides pressurized air to each wheel brake control unit WBCU of the front axle. The first and second air supply circuits AC1, AC2 are arranged to receive air from an air compressor 60 and an associated filter/dryer 62. Pressurized air coming from the air compressor 60 and the filter/dryer 62, may be supplied to a trunk portion AC0 and an air distribution manifold 11 to be distributed to the first and second air supply circuits AC1, AC2.

A towing vehicle may include a multi-circuit protection valve assembly (referred to hereinafter simply as "MCPV") 6, preferably housing components inside a protective enclosure to provide mechanical and moisture protection. One non-limiting type of a multi-circuit protection valve includes an air production module (APV) commercially available from Bendix Commercial Vehicle Systems (a member of Knorr-Bremse AG (Munich, Germany)) The MCPV 6 may be located in any suitable location of a towing vehicle, such as behind or below a vehicle cabin. The MCPV 6 may provide distribution manifold utility, with ports thereof including mechanical overflow valves that remain open based on pressure differential around the valve, and the MCPV 6 may include various valves, solenoids, relay valves, pressure sensor(s), and a control unit 61. A parking brake electric input device 18 and an additional braking handle 19 may be provided, and each may output an electric signal to the control unit 61 of the MCPV 6.

The brake system includes a service brake electric input device 16 (e.g., generally including a brake foot pedal) as well as two or more electronic brake control units 71, 72 (which may include autonomous drive ECU1, ECU1) arranged to process signals from the service brake electric input device 16 and deliver one or more electrical control signals ES1, ES2 to the control unit 61 of the MCPV 6. The electrical control signals ES1, ES2 may be further processed by the control unit 61 (e.g., to apply a brake torque factor for at least one trailer). The electrical control signals ES1, ES2 may be conventional electrical control signals on dedicated electrical conduits, or may be messages transported on a databus, like a controller area network (CAN) bus or similar data bus. The electronic brake control units 71, 72 may receive signals from sensors 75 (e.g., cameras, radars, lidars, and/or communication data received from various fixed or mobile traffic aware entities). Further, the control unit 61 of the MCPV 6, and/or each associated WBCU, may receive signals from wheel speed sensors (optionally including multiple sensors WSSa, WSSb per braked wheel or pair of twin braked wheels).

Having introduced an electro-pneumatic braking system in connection with FIG. 2, a system and method for handling a brake torque factor (particularly a trailer brake torque factor) of a combination vehicle will now be described.

Figure 4:
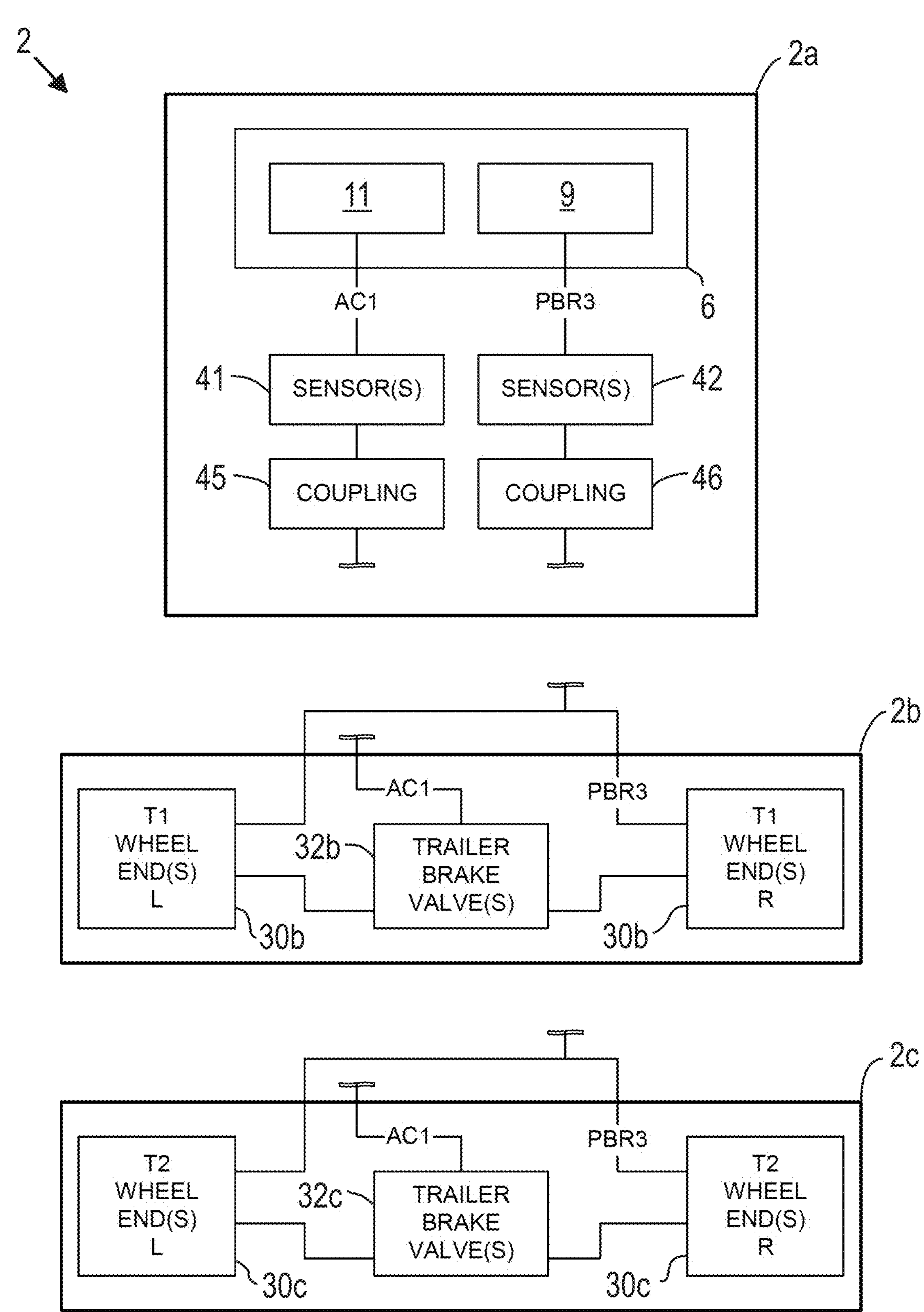
FIG. 4 is a diagrammatical layout of selected pneumatic and sensory components of a braking system of a combination vehicle including first and second trailers having wheel ends incorporating brake pneumatic actuators.

FIG. 4 is a diagrammatical layout of various pneumatic and sensory components of a braking system of a combination vehicle 2 including a towing vehicle 2*a* as well as first and second trailers 2*b*, 2*c* having wheel ends 30*b*, 30*c* incorporating brake pneumatic actuators (e.g., BA in FIG. 3 with corresponding parking brake and service brake functionality) as well as disc brake or drum brake components as known in the art. The towing vehicle 2*a* includes multi-circuit protection valve (MCPV) 6, which includes an air distribution manifold 11 (as part of first air supply circuit AC1) and a trailer relay valve 9 (as part of parking brake release air circuit PBR3). A first coupling for 45 is provided for the first air supply circuit AC1, and a second coupling 46 is provided for the parking brake release air circuit PBR3, to permit these circuits AC1, PBR3 to be extended via removable conduits (e.g., hoses) to wheel ends 30*b* of the first trailer 2*b* and wheel ends 30*c* of the second trailer 2*c*. Each trailer 2*b*, 2*c* may include trailer brake valve(s) 32*b*, 32*c* upstream of the wheel ends 30*b*, 30*c* to assist with operation of service brakes thereof. Sensors 41 are associated with the first air supply circuit AC1, and sensors 42 are associated with the parking brake release air circuit PBR3. The sensors 41, 42 may include one or more of pressure sensors, differential pressure sensors, volumetric air flow sensors, mass air flow sensors, and timers, to assist in measuring or estimating air volume of brake actuators of the trailer wheel ends 30*b*, 30*c*.

The sensors 41, 42 may be used in various ways to measure or estimate air volume of brake actuators of the trailer wheel ends 30*b*, 30*c*. In one example, when parking brakes of the trailer wheel ends 30*b*, 30*c* are filled with air, or whenever the trailer parking brakes are drained, or for a predefined frequency, the braking system of the combination vehicle may apply brakes to the trailers 2*b*, 2*c* to perform an estimation. In one example, estimation of air volume may be performed for other braking cycles, but results of such estimation may be utilized with a lower weightage or confidence level relative to measurement or estimation performed upon trailer parking brake filling, trailer parking brake draining, or trailer parking brake application according to a predefined frequency. In one example, one or more of the sensors 41, 42 may include volumetric air flow sensors and may be used to determine air volume needed to fill trailer parking brakes at wheel ends 30*b*, 30*c* as a basis to estimate trailer brake air volume. In one example, one or more of the sensors 41, 42 may include mass air flow sensors and may be used to determine air volume needed to fill trailer parking brakes at wheel ends 30*b*, 30*c* as a basis to estimate trailer brake air volume. In one example, one or more of the sensors 41, 42 may include absolute and/or differential pressure sensors and may be used (e.g., in conjunction with mass flow rate for supplied air, which may be known or sensed) for to determine pressure drop on a trailer brake circuit supplying wheel ends 30*b*, 30*c* as a basis to estimate trailer brake air volume. In one example, one or more of the sensors 41, 42 may include timers used to estimate time required to fill trailer parking brakes at when ends 30*b*, 30*c* as a basis to estimate trailer brake air volume. Outputs of these sensors 41, 42 may be supplied to a processor (e.g., 51 in FIG. 5) to generate a measured or estimated trailer brake air volume.

Figure 5:
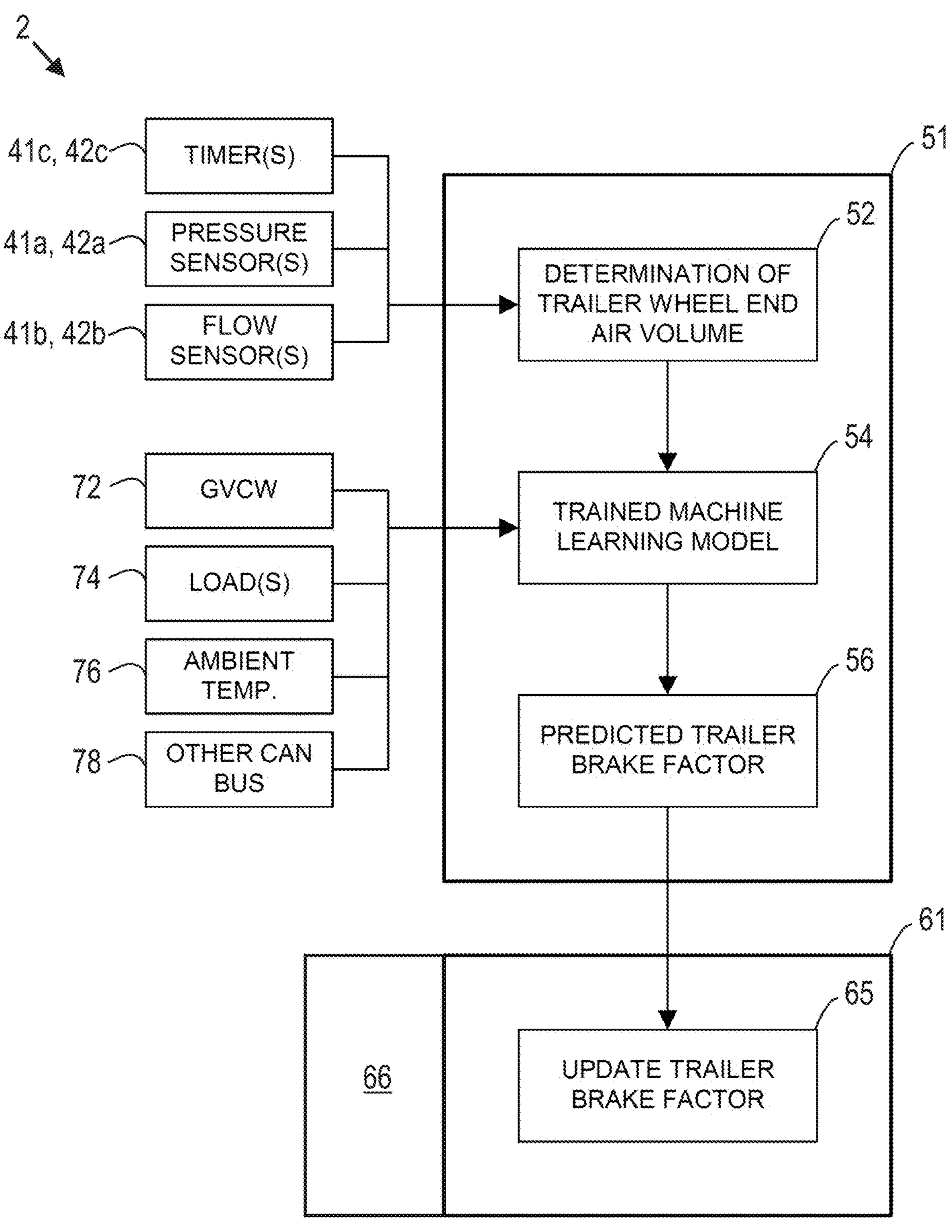
FIG. 5 is a diagrammatic layout of a system for handling a brake torque factor of a combination vehicle according to an example.

FIG. 5 is a diagrammatic layout of a system for handling a brake torque factor of a combination vehicle according to an example. Various sensors (e.g., pressure sensors 41*a*, 42*a*, mass and/or volumetric flow sensors 41*b*, 42*b*, and timers 41*c*, 42*c*) may be arranged to supply signals/information to a processor 51 (which may embody or be part of a processing module) to permit estimation of trailer wheel end air volume using the signals or information provided by the sensors, according to processing block 52. The estimated trailer wheel end air volume is supplied as an input to a trained machine learning model to generate, by the processor 51, a predicted brake torque factor, according to processing block 54. In certain examples, one or more additional inputs may also be supplied to the trained machine learning model at processing block 54 to assist in generation of the predicted brake torque factor. In one example, gross vehicle combination weight (GVCW) 72 (representing gross weight of the combination vehicle 2) may be supplied as an input to the trained machine learning model at processing block 54 to assist in generation of the predicted brake torque factor. In one example, load(s) 74 (e.g., individual drive axle load information for the towing vehicle, which may be determined by sensors associated with a towing vehicle trailer coupling or fifth wheel)) may be supplied as an input to the trained machine learning model at processing block 54 to assist in generation of the predicted brake torque factor. In one example, ambient temperature 76 of an environment containing the combination vehicle, and/or brake component temperature 76 may be supplied as input(s) to the trained machine learning model at processing block 54 to assist in generation of the predicted brake torque factor. In one example, other Controller Area Network (CAN) bus information (which may include driver control inputs produced by a driver of a towing vehicle or the combination vehicle) 78 may be supplied as an input to the trained machine learning model at processing block 54 to assist in generation of the predicted brake torque factor. The predicted trailer brake torque factor 56 for trailers of the combination vehicle 2 is output by the trained machine learning model. This predicted brake torque factor 56 is then communicated to electronic control unit (ECU) 61 of the combination vehicle 2 and used (e.g., by control module 66) to reconfigure the ECU 61 with the predicted brake torque factor 56 for trailers of the combination vehicle 2, according to processing block 54. Thereafter, the predicted brake torque factor may be utilized by the ECU 61 in adjusting a brake pressure request sent to the at least one trailer to achieve a desired brake torque wheel ends of at the at least one trailer (e.g., 2*b*, 2*c* in FIG. 4) and attain a targeted deceleration of the combination vehicle 2.

In one example, the functions identified in FIG. 5 may be automatically performed each time a new trailer is connected to a towing vehicle (e.g., when parking brakes of trailer wheel ends are filled with air), whenever trailer parking brakes are drained (e.g., by application and release of parking brakes), whenever a trailer load changes (e.g., upon loading or unloading of cargo), responsive to issuance of a brake request (e.g., request for application of a parking brake) to at least one trailer, and/or at predetermined time intervals.

In one example, a Recurrent Neural Network (RNN) using time series data may be employed for training the trained machine learning model (utilized at processing block 54 in FIG. 5). A RNN is a class of neural network which allows previous outputs to be used as inputs, while also having the possibility of hidden states. The connections between nodes of the RNN form a directed graph along a temporal sequence, which allows the RNN to exhibit temporal dynamic behavior. In on example, a vehicle manufacturer or other entity can collect data for brake torque factor as a function of trailer end air volume and any one or more of the other parameters and conditions specified herein (e.g., gross weight of a combination vehicle, individual drive axle load information for the towing vehicle, motion of the combination vehicle, temperature of an environment in which the combination vehicle is located, brake component temperature, and driver control inputs produced by a driver of a towing vehicle or the combination vehicle). In one example, a RNN is trained based on a plurality of training combination vehicles having differing numbers of trailers and differing associated brake torque factors. Sensor data can be collected for combination vehicles with various trailers while the combination vehicle is driven and/or tested. The sensor data may then be compared using a sensitivity analysis to determine which features should be input to a machine learning algorithm that outputs the RNN. For example, a sensitivity analysis can execute algorithms (such as a one-at a time test, a derivative-based local method, regression analysis, variance-based method, screening, scatter plots, etc.) to identify how a given input/variable affects brake torque factor. Outputs of the sensitivity analysis, as well as the combined training data, can then be used by the machine learning algorithm to output the RNN. For example, test data associated with the factors identified by the sensitivity analysis can be input into Python, MatLab®, or other development software configured to construct an RNN based on factor-specific data. Depending on the specific scenario, users can adjust the RNN construction by selecting from optimization methods including (but not limited to) the least-squares method, the Levenberg-Marquardt algorithm, the gradient descent method, or the Gauss-Newton method. In one example, training of the machine learning model may utilize any of the following methods: Linear Regression, Ridge Regression, Neural Network Regression, Lasso Regression, Decision Tree Regression, Random Forest, KNN Model, Support Vector Machines (SVM), Gaussian Regression, and Polynomial Regression.

The trained machine learning model can predict trailer brake torque factor for a given trailer subject to specified conditions based on current and past conditions. Once the machine learning model is trained, it can be loaded into the memory of a computer system and then executed by a processor of that computer system. Although the example shown in FIG. 5 shows the trained machine learning model as being deployed in or by processor 61, in one example the trained machine learning model may be deployed in any controller on board of the combination vehicle 2, or in a server-based controller that receives necessary feature data via a network link (e.g., wireless or wired) and generates the precited brake torque factor 56.

Figure 6:
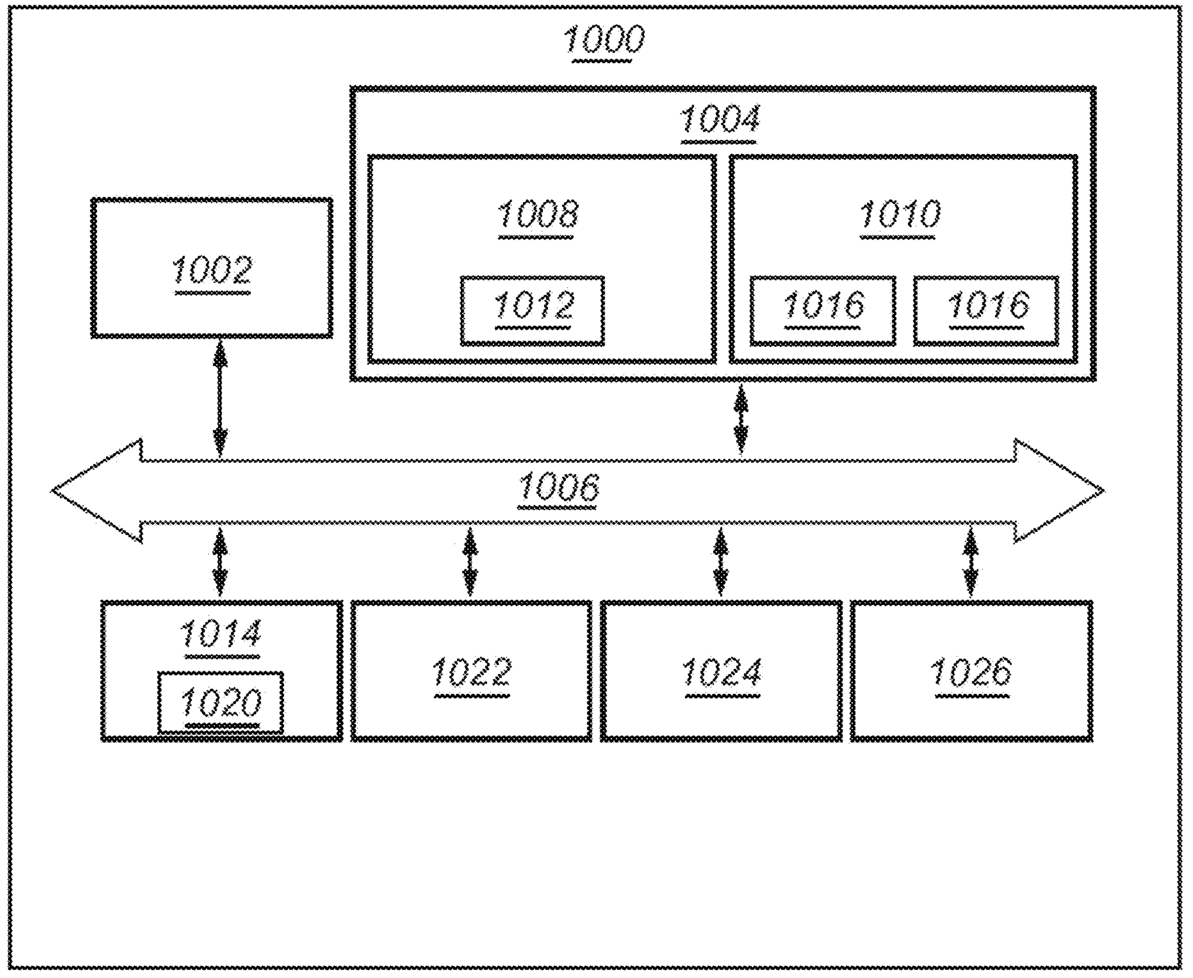
FIG. 6 illustrates an example computer system.

FIG. 6 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or indication processing or for executing computer code stored in memory 1004. The processing circuitry 1002 may, for example, include a general-purpose processor, an application specific processor, a Digital indication Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A method for handling a brake torque factor of a combination vehicle including a towing vehicle and at least one trailer, the method comprising: sensing at least one condition indicative of air volume of trailer wheel ends of the at least one trailer and producing at least one sensor output; estimating an air volume for the trailer wheel ends of the at least one trailer, utilizing at least one sensor output obtained from one or more sensors configured to sense at least one condition indicative of air volume of trailer wheel ends of the at least one trailer; generating, by a trained machine learning model, a predicted brake torque factor for the at least one trailer utilizing at least one input, wherein the at least one input comprises the estimated air volume; and reconfiguring an electronic control unit of the combination vehicle with the predicted brake torque factor to permit the electronic control unit to utilize the predicted brake torque factor in adjusting a brake pressure request sent to the at least one trailer to achieve a desired brake torque at the at least one trailer and attain a targeted deceleration of the combination vehicle.

Example 2: The method of Example 1, wherein the at least one input further comprises one or more of: a gross weight of the combination vehicle, and individual drive axle load information for the towing vehicle.

Example 3: The method of any one of Examples 1 or 2, wherein the at least one input further comprises signals indicative of one or more of: motion of the combination vehicle; temperature of an environment in which the combination vehicle is located; brake component temperature; and driver control inputs produced by of a driver of the towing vehicle.

Example 4: The method of any one of Examples 1 to 3, further comprising issuing a brake request to the at least one trailer, wherein the sensing of the at least one condition is performed responsive to issuance of the brake request.

Example 5: The method of Example 4, wherein the brake request is configured to apply a parking brake of the at least one trailer.

Example 6: The method of any one of Examples 1 to 5, wherein the sensing of the at least one condition indicative of air volume of the trailer wheel ends of the at least one trailer comprises at least one of: detecting a time required to fill the trailer wheel ends of the at least one trailer with air; detecting a volumetric and/or mass flow rate of air while filling the trailer wheel ends of the at least one trailer with air; and detecting a pressure differential between a pressurized air source and the trailer wheel ends of the at least trailer while filling the trailer wheel ends with air.

Example 7: The method of any one of Examples 1 to 6, wherein the trained machine learning model is trained based on a plurality of training combination vehicles having differing numbers of trailers and differing associated brake torque factors.

Example 8: The method of any one of Examples 1 to 6, wherein the trained machine learning model is trained with a recurrent neural network.

Example 9: A computer program product comprising program code for performing, when executed by processing circuitry, the method of any one of Examples 1 to 8.

Example 10: A non-transitory computer-readable storage medium comprising instructions, which when executed by processing circuitry, cause the processing circuitry to perform the method of any one of Examples 1 to 8.

Example 11: A system for handling a brake torque factor of a combination vehicle including a towing vehicle and at least one trailer, the system comprising: one or more sensors configured to sense at least one condition indicative of air volume of trailer wheel ends of the at least one trailer and produce a corresponding at least one sensor output; a processing module configured to: (i) estimate an air volume for the trailer wheel ends of the at least one trailer utilizing at least one sensor output, and (ii) generate, by a trained machine learning model, a predicted brake torque factor for the at least one trailer utilizing at least one input, wherein the at least one input comprises the estimated air volume; and a control module arranged to reconfigure an electronic control unit of the combination vehicle with the predicted brake torque factor to permit the electronic control unit to utilize the predicted brake torque factor in adjusting a brake pressure request sent to the at least one trailer to achieve a desired brake torque at the at least one trailer and attain a targeted deceleration of the combination vehicle.

Example 12: The system of Example 11, wherein the processing module comprises a processor and a non-transitory computer-readable memory device having stored therein an artificial neutral network and instructions which, when executed by the processor, cause the processor the generate the predicted brake torque factor for the at least one trailer utilizing at least one input.

Example 13: The system of any one of Examples 11 or 12, wherein the at least one input further comprises one or more of: a gross weight of the combination vehicle, and individual drive axle load information for the towing vehicle.

Example 14: The system of any one of Examples 11 to 13, wherein the at least one input further comprises signals indicative of one or more of: motion of the combination vehicle; temperature of an environment in which the combination vehicle is located; and driver control inputs produced by of a driver of the towing vehicle.

Example 15: The system of any one of Examples 11 to 14, wherein the processing module is configured to generate the predicted brake torque factor responsive to issuance of a brake request to the at least one trailer following a filling of the trailer wheel ends of the at least one trailer with air.

Example 16: The system of Example 15, wherein the brake request is configured to apply a parking brake of the at least one trailer.

Example 17: The system of any one of Examples 11 to 16, wherein the at least one condition indicative of air volume of the trailer wheel ends of the at least one trailer comprises at least one of: a time required to fill the trailer wheel ends of the at least one trailer with air; a volumetric or mass flow rate for filling the trailer wheel ends of the at least one trailer with air; and a pressure differential between a pressurized air source and the trailer wheel ends of the at least trailer while filling the trailer wheel ends with air.

Example 18: The system of any one of Examples 11 to 17, wherein the trained machine learning model is trained based on a plurality of training combination vehicles having differing numbers of trailers and differing associated brake torque factors.

Example 19: The system of any one of Examples 11 to 17, wherein the trained machine learning model is trained with a recurrent neural network.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for handling a brake torque factor of a combination vehicle including a towing vehicle and at least one trailer, the method comprising:

sensing at least one condition indicative of air volume of trailer wheel ends of the at least one trailer and producing at least one sensor output;

estimating an air volume for the trailer wheel ends of the at least one trailer, utilizing the at least one sensor output obtained from one or more sensors configured to sense the at least one condition indicative of air volume of trailer wheel ends of the at least one trailer;

generating, by a trained machine learning model, a predicted brake torque factor for the at least one trailer utilizing at least one input, wherein the at least one input comprises the estimated air volume; and reconfiguring an electronic control unit of the combination vehicle with the predicted brake torque factor to permit the electronic control unit to utilize the predicted brake torque factor in adjusting a brake pressure request sent to the at least one trailer to achieve a desired brake torque at the at least one trailer and attain a targeted deceleration of the combination vehicle.

2. The method of claim 1, wherein the at least one input further comprises one or more of: a gross weight of the combination vehicle, and individual drive axle load information for the towing vehicle.

3. The method of claim 1, wherein the at least one input further comprises signals indicative of one or more of: motion of the combination vehicle; temperature of an environment in which the combination vehicle is located; brake component temperature; and driver control inputs produced by of a driver of the towing vehicle.

4. The method of claim 1, further comprising issuing a brake request to the at least one trailer, wherein the sensing of the at least one condition is performed responsive to issuance of the brake request.

5. The method of claim 4, wherein the brake request is configured to apply a parking brake of the at least one trailer.

6. The method of claim 1, wherein the sensing of the at least one condition indicative of air volume of the trailer wheel ends of the at least one trailer comprises at least one of:

detecting a time required to fill the trailer wheel ends of the at least one trailer with air;

detecting a volumetric and/or mass flow rate of air while filling the trailer wheel ends of the at least one trailer with air; and detecting a pressure differential between a pressurized air source and the trailer wheel ends of the at least trailer while filling the trailer wheel ends with air.

7. The method of claim 1, wherein the trained machine learning model is trained based on a plurality of training combination vehicles having differing numbers of trailers and differing associated brake torque factors.

8. The method of claim 1, wherein the trained machine learning model is trained with a recurrent neural network.

9. A non-transitory computer-readable storage medium comprising instructions, which when executed by processing circuitry, cause the processing circuitry to perform the method of claim 1.

10. A system for handling a brake torque factor of a combination vehicle including a towing vehicle and at least one trailer, the system comprising:

one or more sensors configured to sense at least one condition indicative of air volume of trailer wheel ends of the at least one trailer and produce a corresponding at least one sensor output;

a processing module configured to: (i) estimate an air volume for the trailer wheel ends of the at least one trailer utilizing the at least one sensor output, and (ii) generate, by a trained machine learning model, a predicted brake torque factor for the at least one trailer utilizing at least one input, wherein the at least one input comprises the estimated air volume; and a control module arranged to reconfigure an electronic control unit of the combination vehicle with the predicted brake torque factor to permit the electronic control unit to utilize the predicted brake torque factor in adjusting a brake pressure request sent to the at least one trailer to achieve a desired brake torque at the at least one trailer and attain a targeted deceleration of the combination vehicle.

11. The system of claim 10, wherein the processing module comprises a processor and a non-transitory computer-readable memory device having stored therein an artificial neutral network and instructions which, when executed by the processor, cause the processor to generate the predicted brake torque factor for the at least one trailer utilizing the at least one input.

12. The system of claim 10, wherein the at least one input further comprises one or more of: a gross weight of the combination vehicle, and individual drive axle load information for the towing vehicle.

13. The system of claim 10, wherein the at least one input further comprises signals indicative of one or more of: motion of the combination vehicle; temperature of an environment in which the combination vehicle is located; and driver control inputs produced by of a driver of the towing vehicle.

14. The system of claim 10, wherein the processing module is configured to generate the predicted brake torque factor responsive to issuance of a brake request to the at least one trailer following a filling of the trailer wheel ends of the at least one trailer with air.

15. The system of claim 14, wherein the brake request is configured to apply a parking brake of the at least one trailer.

16. The system of claim 10, wherein the at least one condition indicative of air volume of the trailer wheel ends of the at least one trailer comprises at least one of:

a time required to fill the trailer wheel ends of the at least one trailer with air;

a volumetric or mass flow rate for filling the trailer wheel ends of the at least one trailer with air; and a pressure differential between a pressurized air source and the trailer wheel ends of the at least trailer while filling the trailer wheel ends with air.

17. The system of claim 10, wherein the trained machine learning model is trained based on a plurality of training combination vehicles having differing numbers of trailers and differing associated brake torque factors.

18. The system of claim 10, wherein the trained machine learning model is trained with a recurrent neural network.

* * * * *